US006732532B2

(12) United States Patent
Camy et al.

(10) Patent No.: US 6,732,532 B2

(45) Date of Patent: May 11, 2004

(54) RESILIENT MOUNT FOR A CMC COMBUSTION CHAMBER OF A TURBOMACHINE IN A METAL CASING

(75) Inventors: Pierre Camy, Saint Medard en Jalles (FR); Benoît Carrere, Letaillan (FR); Eric Conete, Merignac (FR); Alexandre Forestier, Boissise la Bertrand (FR); Georges Habarou, Le Bouscat (FR); Didier Hernandez, Quiers (FR)

(73) Assignee: SNECMA Moteurs, Paris (FR)

( * ) Notice: Subject to any disclaimer, the term of this patent is extended or adjusted under 35 U.S.C. 154(b) by 42 days.

(21) Appl. No.: 10/162,189

(22) Filed: Jun. 5, 2002

(65) Prior Publication Data

US 2002/0184890 A1 Dec. 12, 2002

(30) Foreign Application Priority Data

Jun. 6, 2001 (FR) ........................................... 01 07361

(51) Int. Cl.[7] ................................................ F02C 7/20

(52) U.S. Cl. ........................................... 60/796; 60/800

(58) Field of Search .......................... 60/796, 800, 757

(56) References Cited

U.S. PATENT DOCUMENTS 2,268,464 A * 12/1941 Seippel ....................... 60/800
2,509,503 A 5/1950 Huyton
4,688,378 A * 8/1987 Harris ......................... 60/800
4,821,522 A * 4/1989 Matthews et al. ............ 60/757
5,291,733 A * 3/1994 Halila ......................... 60/796
6,131,384 A 10/2000 Ebel
6,334,298 B1 * 1/2002 Aicholtz ....................... 60/96
6,397,603 B1 * 6/2002 Edmondson et al. ......... 60/800

FOREIGN PATENT DOCUMENTS

| | | |
|---|---|---|
| EP | 1 035 377 | 9/2000 |
| GB | 1 570 875 | 7/1980 |
| GB | 2 035 474 | 6/1990 |

* cited by examiner

*Primary Examiner*—Michael Koczo

(74) *Attorney, Agent, or Firm*—Oblon, Spivak, McClelland, Maier & Neustadt, P.C.

(57) ABSTRACT

In a turbomachine comprising an annular shell of metal material containing in a gas flow direction F: a fuel injection assembly; an annular combustion chamber of composite material; and an annular nozzle of metal material forming the inlet stage with fixed blades of a high pressure turbine, provision is made for the combustion chamber to be held in position inside the annular metal shell by a plurality of flexible metal tongues each comprising three branches connected together in a star configuration, the ends of two of these three branches being fixed securely to a downstream end of the combustion chamber via respective first and second fixing means, and the end of the third branch being fixed securely to the annular shell via third fixing means.

13 Claims, 3 Drawing Sheets

RESILIENT MOUNT FOR A CMC COMBUSTION CHAMBER OF A TURBOMACHINE IN A METAL CASING

FIELD OF THE INVENTION

The present invention relates to the specific field of turbomachines and more particularly it relates to the problem posed by mounting a combustion chamber made of a ceramic matrix composite (CMC) type material in the metal casing of a turbomachine.

PRIOR ART

Conventionally, in a turbojet or a turboprop, the high pressure turbine (HPT) and in particular its inlet nozzle, the combustion chamber, and the casing (or "shell") of said chamber are all made of the same material, generally a metal. However, under certain particular conditions of use implementing very high combustion temperatures, using a metal chamber turns out to be completely unsuitable from a thermal point of view and it is necessary to make use of a chamber based on high temperature composite materials of the CMC type. Unfortunately, the difficulties of working such materials and their raw material costs mean that use thereof is generally restricted to the combustion chamber itself, while the high pressure turbine inlet nozzle and the casing continue to be made more conventionally out of metal materials. Unfortunately, metal materials and composite materials have coefficients of thermal expansion that are very different. This gives rise to particularly severe problems in making connections between the casing and the combustion chamber and at the interface with the nozzle at the inlet to the high pressure turbine.

OBJECT AND BRIEF SYMMETRY OF THE INVENTION

The present invention mitigates those drawbacks by proposing a mounting for the combustion chamber in the casing that has the ability to absorb the displacements induced by the different coefficients of expansion of these parts. An object of the invention is also to propose a mount that enables manufacture of the combustion chamber to be simplified.

These objects are achieved by a turbomachine comprising an annular shell of metal material containing in a gas flow direction F: a fuel injection assembly; an annular combustion chamber of composite material having a longitudinal axis; and an annular nozzle of metal material having fixed blades and forming the inlet stage of a high pressure turbine; wherein said composite material combustion chamber is held in position in said annular metal shell by a plurality of flexible metal tongues regularly distributed around said combustion chamber, each of said tongues comprising three branches connected in a star configuration, the ends of two of the three branches being securely fixed to a downstream end of said composite material combustion chamber remote from said injection system via respective first and second fixing means, while the end of the third branch thereof is securely fixed to said annular metal shell by third fixing means, the flexibility of said fixing tongues making it possible at high temperatures for said composite material combustion chamber to expand freely in a radial direction relative to said annular metal shell.

With this particular structure for the fixed connection, the various kinds of wear due to contact corrosion in prior art systems can be avoided, and the presence of the elastic tongues replacing traditional flanges gives rise to an appreciable weight saving. In addition, because of their elasticity, these tongues can easily accommodate the differences of expansion that appear at high temperatures between parts made of metal and parts made of composite materials, while continuing to hold the combustion chamber properly and well centered inside the casing.

In a first embodiment, each of said first, second, and third fixing means is constituted by a plurality of bolts. In an alternative embodiment, only the third fixing means are constituted by a plurality of bolts, the first and second fixing means each preferably being constituted by a plurality of crimping elements.

Advantageously, the turbomachine of the invention further comprises a closure ring of ceramic composite material securely fixed to said downstream end of the combustion chamber, the ring being designed to form a bearing plane for a sealing gasket that provides sealing between said combustion chamber and said nozzle. Preferably, said closure ring is brazed to said downstream end of the combustion chamber. It may include a folded-back portion lying in line with the side wall of the combustion chamber.

In a first preferred variant embodiment, said bearing plane for the gasket lies in a plane perpendicular to said longitudinal axis of said combustion chamber.

In a second preferred variant embodiment, said bearing plane for the gasket lies in a plane parallel to said longitudinal axis of said combustion chamber.

In both these two variant configurations, the gasket is preferably of the omega type.

In a third preferred variant embodiment, said gasket is of the omega type. In this configuration, the gasket is preferably of the "spring-blade" type being held against said closure ring by means of a resilient element secured to said nozzle. Advantageously, the gasket can have a plurality of calibrated leakage orifices.

BRIEF DESCRIPTION OF THE DRAWINGS

The characteristics and advantages of the present invention appear more fully from the following description made by way of non-limiting indication with reference to the accompanying drawings, in which.

DETAILED DESCRIPTION OF A PREFERRED EMBODIMENT

Figure 1:
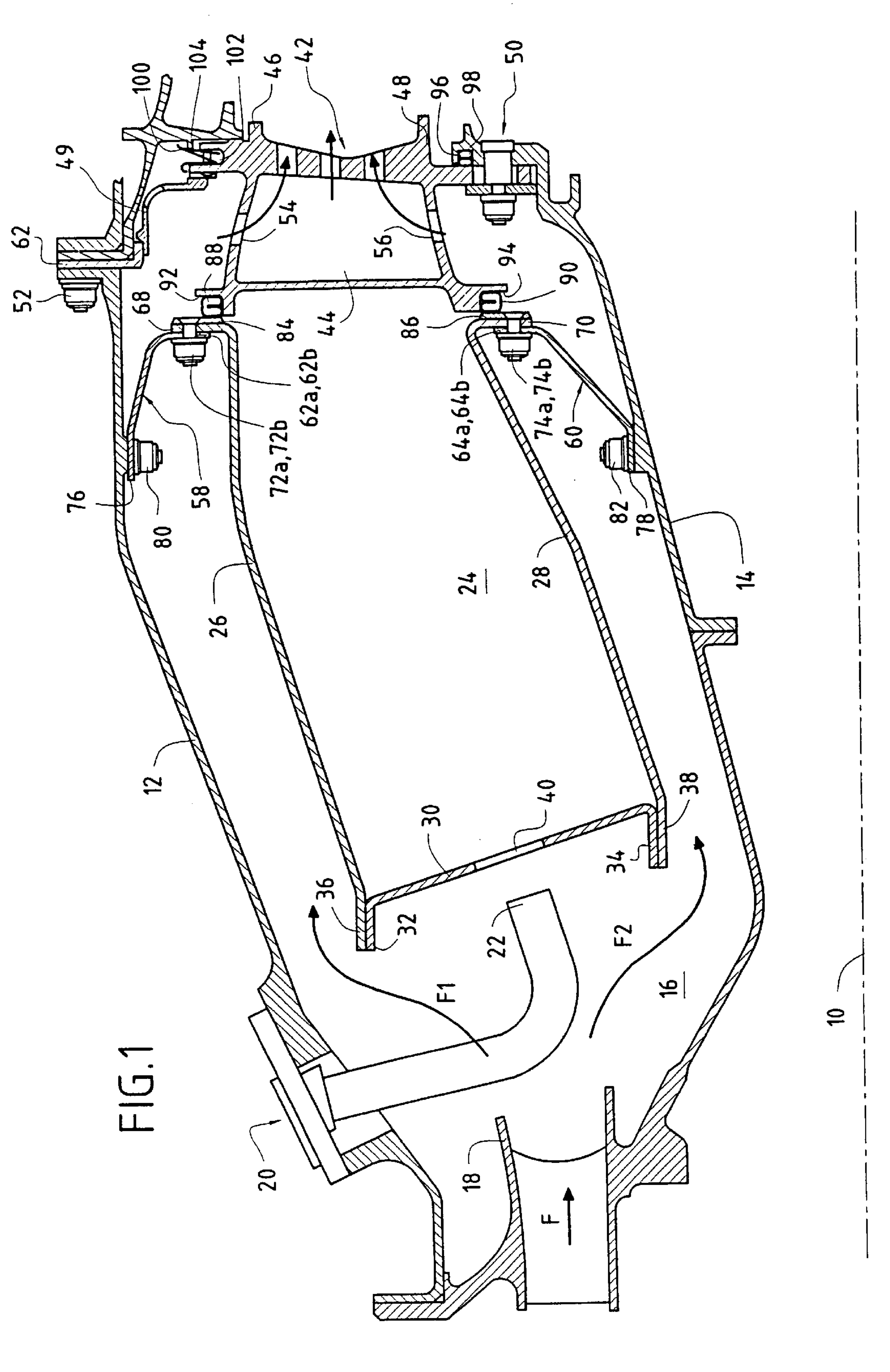
FIG. 1 is a diagrammatic axial half-section of a central portion of a turbomachine in a first embodiment of the invention.

FIG. 1 is an axial half-section of a central portion of a turbojet or a turboprop (referred to as a "turbomachine" in the description below), comprising:

- an outer annular shell (or outer casing) 12 of metal material having a longitudinal axis 10;
- an inner annular shell (or inner casing) 14 that is coaxial therein and likewise made of metal material; and an annular space 16 extending between the two shells 12 and 14 and receiving compressed oxidizer, generally air, coming from an upstream compressor (not shown) of the turbomachine via an annular diffusion duct 18 defining a general gas flow direction F.

In the gas flow direction, the space 16 contains firstly an injection assembly formed by a plurality of injection systems 20 regularly distributed around the duct 18 and each comprising a fuel injection nozzle 22 fixed to the outer annular shell 12 (in order to simplify the drawings, the mixer and the deflector associated with each injection nozzle are not shown), followed by a combustion chamber 24 of high temperature composite material, e.g. of the CMC type or the like (e.g. carbon) formed by an outer axially-extending side wall 26 and an inner axially-extending side wall 28, both coaxial about the axis 10, and by a transversely-extending end wall 30 of the combustion chamber which includes margins 32 and 34 fixed by any suitable means, e.g. flat-headed metal or refractory bolts to the upstream ends 36, 38 of the side walls 26, 28, the end wall 30 of the chamber being provided with through orifices 40 to enable fuel to be injected together with a fraction of the oxidizer into the combustion chamber 24, and finally an annular nozzle 42 of metal material forming an inlet stage to a high pressure turbine (not shown) and conventionally comprising a plurality of fixed blades 44 mounted between an outer circular platform 46 and an inner circular platform 48. The nozzle rests in particular on support means 49 secured to the annular casing of the turbomachine, and it is fixed thereto by first releasable fixing means preferably constituted by a plurality of bolts 50.

Through orifices 54, 56 provided through the outer and inner metal platforms 46 and 48 of the nozzle 42 are also provided to enable the fixed blades 44 of the nozzle at the entrance to the rotor of the high pressure turbine to be cooled using compressed oxidizer available at the outlet from the diffusion duct 18 and flowing in two flows F1 and F2 on either side of the combustion chamber 24.

Figure 2:
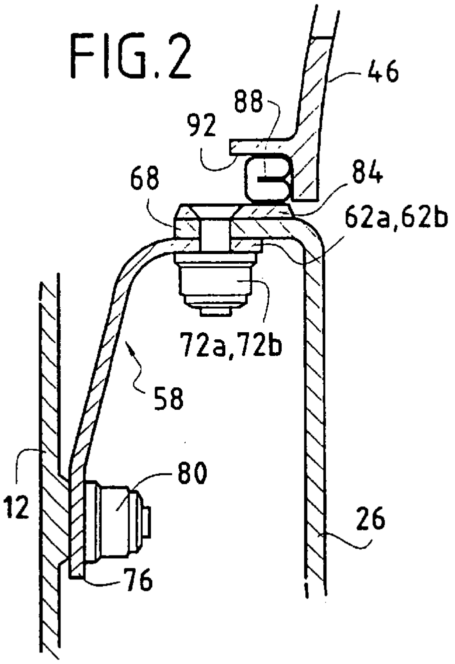
FIG. 2 is an enlarged view of a portion of FIG. 1.

In a first embodiment of the invention, the combustion chamber 24 which has a thermal expansion coefficient that is very different from that of the other parts making up the turbomachine, which parts are made of metal, is held securely in position inside the annular shell by a plurality of flexible tongues 58, 60 that are regularly distributed around the combustion chamber (FIG. 2 shows one such fixing). A first fraction of these fixing tongues (see tongue referenced 58) is fixed between the outer annular shell 12 and the outer side wall 26 of the combustion chamber, and a second fraction of these tongues (such as the tongue 60) is mounted between the inner annular shell 14 and the inner side wall 28 of the combustion chamber.

Figure 3:
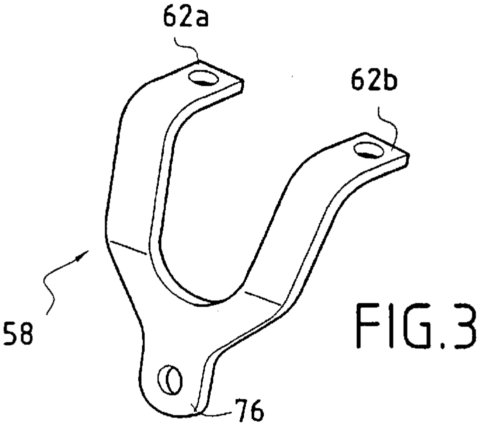
FIG. 3 shows a fixing tongue for the combustion chamber.

Each flexible fixing tongue of metal material, e.g. the tongue 58 shown in FIG. 3, comprises three branches connected together in a star configuration so as to be generally Y-shaped with three attachment points, with the ends 62*a*, 62*b* or 64*a*, 64*b* of two of these three branches being fixed securely to a downstream end of the outer or inner side wall 26 or 28 of the composite material combustion chamber by respective first and second fixing means 72*a*, 74*a* or 72*b*, 74*b*. Said downstream ends, remote from the injection system 20, constitute respective flanges 68, 70, i.e. they lie in a plane perpendicular to the longitudinal axis 10 of the chamber. The end 76 or 78 of the third branch of each tongue is securely fixed to one or other of the outer and inner metal annular shells 12 and 14 by third fixing means 80, 82. It should be observed that depending on the desired degree of flexibility, it is also possible to envisage making the tongues to be of width that is constant or otherwise, and to be U-shaped, or V-shaped, or of some other shape, providing each tongue has three attachment points.

A closure ring 84, 86 of ceramic composite material is held securely, e.g. by brazing, against the flange 68, 70 of the combustion chamber so as to form a bearing plane for a circular sealing gasket 88, 90 of the omega type mounted in a groove 92, 94 of each of the outer and inner platforms 46, 48 of the nozzle and intended to provide sealing between the combustion chamber 24 and the nozzle 42. In addition, the ring is of sufficient thickness to embed the screw heads of the first and second fixing means 72*a* & 74*a* and 72*b* & 74*b*.

The gas flow between the combustion chamber and the turbine is sealed firstly by means of another circular gasket 96 of the omega type mounted in a circular groove 98 of a flange of the inner annular shell 14 in direct contact with the inner circular platform 48 of the nozzle, and secondly by a "spring-blade" gasket 100 mounted in a circular groove 102 of the outer circular platform 46 of the nozzle having one end directly in contact with a circular rim 104 of the outer annular shell 12.

Figure 4:
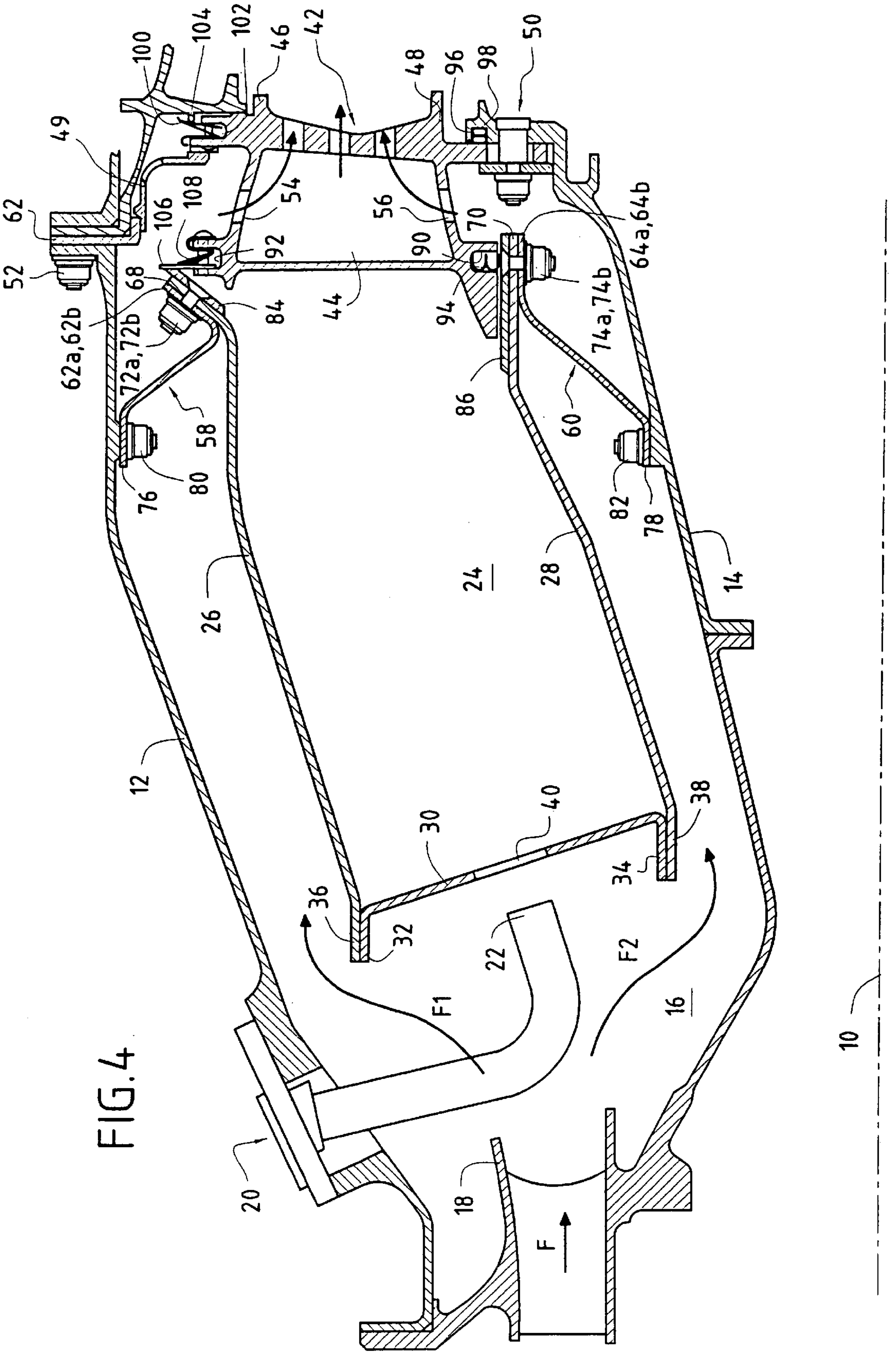
FIG. 4 is a diagrammatic axial half-section of a central portion of a turbomachine in a second embodiment of the invention.

FIG. 4 shows a second embodiment of the invention in which the downstream end of the combustion chamber no longer has a flange configuration perpendicular to the longitudinal axis of the combustion chamber, but on the contrary it has a configuration which is parallel to said axis or is inclined relative thereto (said inclination being at an angle that can be as much as 90°). These non-perpendicular configurations for the downstream end of the combustion chamber make the side walls of the chamber easier to manufacture, in particular by enabling the material to be densified better in this region.

Figure 5:
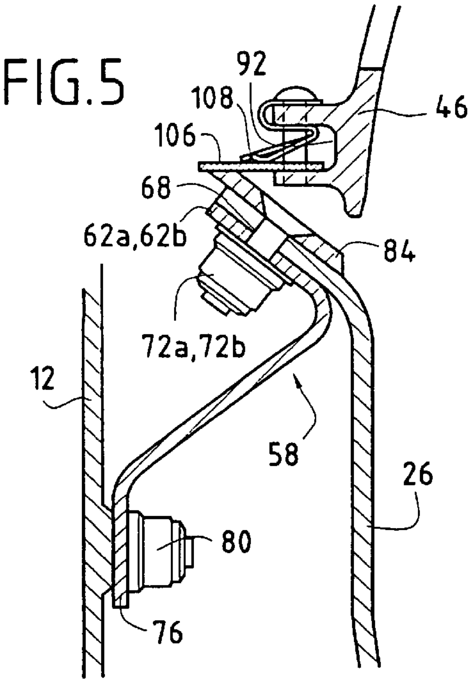
FIG. 5 is an enlarged view of a portion of FIG. 4.
Figure 6:
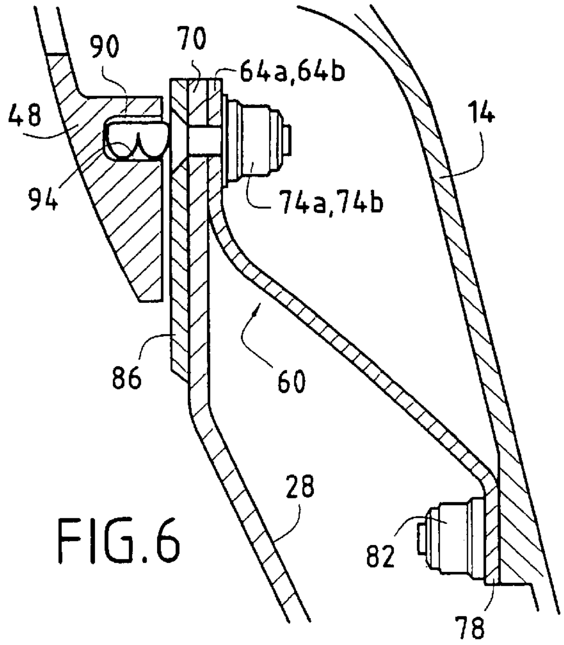
FIG. 6 shows another portion of FIG. 4.

In the example shown, the downstream end 70 of the inner side wall 28 of the combustion chamber presents a configuration that is parallel to the longitudinal axis 10 of the chamber (see detail of FIG. 6) and bears radially via the composite material ring 86 against the inner circular platform 48 of the nozzle. As in the preceding version, this platform is provided with a groove 94 which receives a gasket 90 of the omega type for providing sealing between the combustion chamber 24 and the nozzle 42 at the inner side wall of the chamber. In contrast, the downstream end 68 of the outer side wall 26 of the combustion chamber presents a configuration that slopes relative to the longitudinal axis 10 of the chamber, as can be seen in the detail of FIG. 5. As before, a ring of composite material 84 is preferably brazed to the downstream end so as to form a bearing plane for a gasket that provides sealing between the combustion chamber 24 and the nozzle 42, this time for the outer side wall of said chamber. Nevertheless, because of its inclined configuration, the gasket is now constituted by a circular gasket 106 of the "spring blade" type held against the closure ring by a resilient element 108 secured to the nozzle.

Figure 5A:
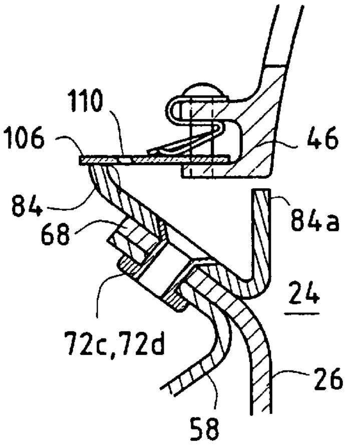
FIG. 5A shows a variant embodiment of the invention.

FIG. 5A shows another variant embodiment of the invention in which the tongues 58 are fixed to the downstream end of the combustion chamber 68 via a crimped connection, bolts 72*a*, 72*b* being replaced by crimping elements 72*c*, 72*d*. Similarly, to improve the flow of the stream of gas, the closure ring 84 is advantageously provided with a folded-back portion 84 in the chamber extending the outer wall 26 of the combustion chamber. In order to cool the dead zone that is thus created beneath the nozzle platform 46 by the folded-back portion of the closure ring (and when the connection is bolted), calibrated leakage orifices 110 are provided through the gasket 106.

Although FIG. 4 shows a configuration with a downstream end of the inner side wall that is parallel and a downstream end of the outer wall that slopes at about 45°, it should be understood that it is entirely possible to provide the opposite configuration with a downstream end for the outer side wall that is parallel and a downstream end for the inner side wall that slopes. In all functional configurations, the flexibility of the fixing tongues 58, 60 serves to accommodate the thermal expansion difference that appears at high temperatures between the combustion chamber that is made of composite material and the annular shell that is made of metal, while continuing to hold and position the chamber.

What is claimed is:

1. A turbomachine comprising an annular shell of metal material containing in a gas flow direction F: a fuel injection assembly; an annular combustion chamber of composite material having a longitudinal axis; and an annular nozzle of metal material having fixed blades and forming the inlet stage of a high pressure turbine; wherein said composite material combustion chamber is held in position in said annular metal shell by a plurality of flexible metal tongues regularly distributed around said combustion chamber, each of said tongues comprising three branches connected in a star configuration, the ends of two of the three branches being securely fixed to a downstream end of said composite material combustion chamber remote from said injection system via respective first and second fixing means, while the end of the third branch thereof is securely fixed to said annular metal shell by third fixing means, the flexibility of said fixing tongues making it possible at high temperatures for said composite material combustion chamber to expand freely in a radial direction relative to said annular metal shell.

2. A turbomachine according to claim 1, wherein each of said first, second, and third fixing means is constituted by a plurality of bolts.

3. A turbomachine according to claim 1, wherein each of said first and second fixing means is constituted by a plurality of crimping elements, said third fixing means being constituted by a plurality of bolts.

4. A turbomachine according to claim 1, further comprising a closure ring of ceramic composite material securely fixed to said downstream end of the combustion chamber, the ring being designed to form a bearing plane for a sealing gasket that provides sealing between said combustion chamber and said nozzle.

5. A turbomachine according to claim 4, wherein said closure ring is brazed to said downstream end of the combustion chamber.

6. A turbomachine according to claim 5, wherein said closure ring has a folded-back portion lying in line with the side wall of the combustion chamber.

7. A turbomachine according to claim 5, wherein said bearing plane for the gasket lies in a plane perpendicular to said longitudinal axis of said combustion chamber.

8. A turbomachine according to claim 5, wherein said bearing plane for the gasket lies in a plane parallel to said longitudinal axis of said combustion chamber.

9. A turbomachine according to claim 7, wherein said gasket is of the omega type.

10. A turbomachine according to claim 5, wherein said bearing plane for the gasket is formed in a plane that slopes relative to said longitudinal axis of the combustion chamber.

11. A turbomachine according to claim 10, wherein said gasket is of the “spring-blade” type.

12. A turbomachine according to claim 11, wherein said “spring-blade” gasket is held against said closure ring by a resilient element secured to said nozzle.

13. A turbomachine according to claim 11, wherein said “spring-blade” gasket includes a plurality of calibrated leakage orifices.

* * * * *